Feb. 21, 1967 D. C. SMITH 3,305,668
CABLE HEATER
Filed Aug. 27, 1964
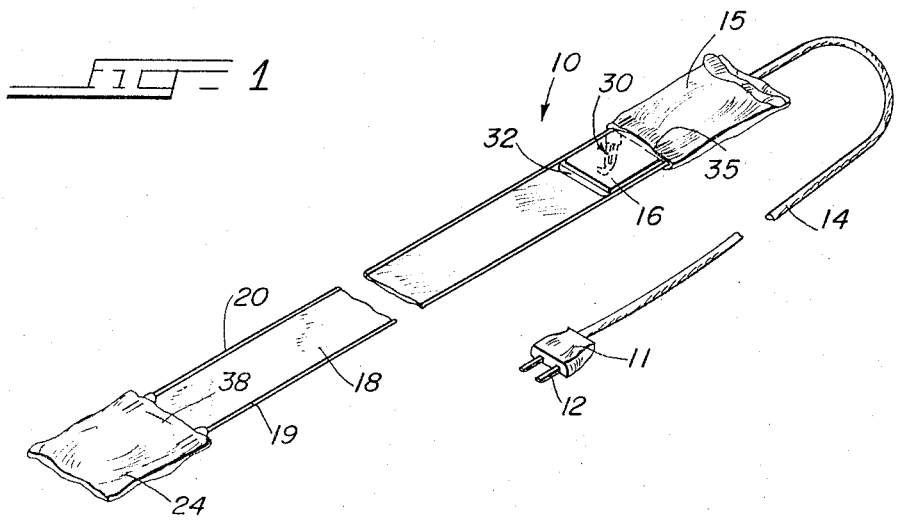
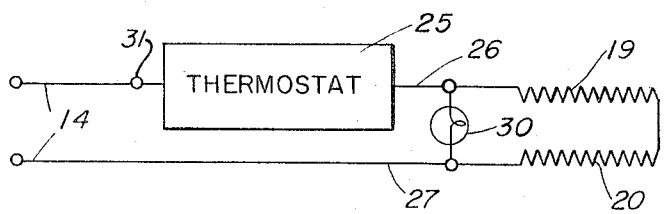
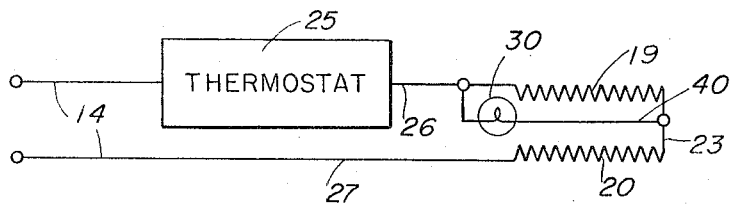
INVENTOR.
DAVID C. SMITH
BY
Wallace, Kinzer & Dorn
ATTYS.

United States Patent Office 3,305,668
Patented Feb. 21, 1967

3,305,668
CABLE HEATER
David C. Smith, 18901 Loras Lane,
Country Club Hills, Ill. 60477
Filed Aug. 27, 1964, Ser. No. 392,524
4 Claims. (Cl. 219—528)

This invention relates to electric heating devices and more particularly to elongated and flexible electrical heating devices which are disposed in environments in which it is difficult to examine the heater's effectiveness.

The present invention is directed to an inexpensive heater cable adapted to be wrapped about pipes, buried in seed starting beds, or disposed in other environments where it is difficult to ascertain whether the heater cable is operating. Typically, an inexpensive heater cable of the kind to which the present invention is directed includes one or more flexible resistance elements and a thermostat for controlling an electrical circuit for the resistance elements. One of the typical uses for such a heater is that of heating water pipes which are exposed to temperatures which might otherwise freeze the pipes and cause breaking thereof. For instance, water pipes under house trailers or along an outside wall of a building are frequently wrapped with such a low cost heater and may be thermostatically controlled to maintain the pipe at 32 degrees or higher temperature to prevent the freezing of water therein.

Heretofore, considerable difficulty was entailed in trying to establish whether or not the device was working properly, particularly where only infrequent examinations were made of the heater device located in a relatively inaccessible location. Thus, where the heater cable was wrapped about the water pipe beneath a house trailer, it was necessary to crawl under the trailer and feel the heater and the pipe to ascertain whether or not the heater was working. However, no heat can be felt at or below 10° F. Also where the heater device and pipe were only heated to 32° F. or a slightly higher temperature and where the ambient temperature was not too different, it was extremely difficult, if not impossible, to tell by the human touch whether or not the heater device was working properly.

Accordingly, an object of the present invention is to indicate the satisfactory performance of a heater cable by means of an indicator light giving a positive indication of the availability of electrical power to the heater.

Another object of the invention is to provide a heater cable device having an indicator light whose circuit is controlled by the thermostat of the heater to open the circuit for the indicator light when the heater cable device is not heating and to close the circuit for indicator light when the thermostat completes the electrical circuit for the heater resistance elements. Another object of the present invention is to indicate by a light that the thermostat is closed and also to indicate that the circuit through said resistance element is also being completed.

A specific object of the invention is to provide a new, improved heating cable device of low cost and inexpensive manufacture, including a small neon lamp disposed in a plastic insulated envelope, which is relatively flat and conforms to the heater cable, and is electrically connected in that part of the circuit for the cable device which is completed by a thermostat.

Other and further objects of the present invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:
FIG. 1 is a perspective view of a heater cable device according to the preferred embodiment of the invention;
FIG. 2 is an electrical schematic diagram of the heater cable device of FIG. 1; and
FIG. 3 is an electrical schematic diagram of another embodiment of the invention.

Referring now to FIG. 1, there is illustrated the preferred embodiment of the heater cable device 10, which includes an electrical plug 11 having prongs 12 to be inserted in a source of electrical power, an input head lead or cord 14, a thermostat envelope 15, an indicator light envelope 16, and a heater cable body 18 having a pair of resistance heating elements 19 and 20 encased in the body 18. The resistance elements 19 and 20 are joined to one another by a suitable electrical connection, FIGS. 2 and 3, disposed within a terminal envelope 24, FIG. 1, fastened to the end of the cable body 18. The heater resistance elements 19 are preferably flexible wires and the body 18 of the cable device 10 is preferably a piece of flexible poly vinyl of relatively thin dimensions so that the cable body and resistance elements 19 and 20 may be readily wrapped about a pipe or the like, not shown.

In typical operations, the cable body 18 is wrapped around a water pipe, disposed beneath the surface of a seed bed or disposed in some other inaccessible location. The plug 11 is connected to an electrical receptacle or extension cord; and as an important aspect of the present invention, the envelope 16 for an indicator lamp 30 is exposed to view in the best available manner so that the lighting of the indicator lamp 30 indicates operation of the heater cable 10.

From an electrical standpoint, the circuit for the resistance elements 19 and 20 would be completed over the following path: from the input lead 14, through the, now closed, thermostat 25, lead 26, heater resistance element 19, terminal connector 23, heater resistance element 20 and back through a return lead 27. The indicator lamp 30 is connected either directly across the line between conducting leads 26 and 27, FIG. 2, or across a lead 26 or 27 and terminal lead 23. Opening of the thermostat 25, for a temperature above the predetermined set temperature for this thermostat, breaks the circuit for the resistance elements 19 and 20, as well as the circuit to neon indicator lamp 30. Conversely, with a closure of the thermostat 25, when the temperature is below the required predetermined temperature, the circuit is completed through the resistance elements 19 and 20 to the input leads 14 to complete a circuit across the neon lamp 30. Thus, the indicator lamp 30 will be lit only when the thermostat 25 is closed to complete the circuit between the input source 14 and the leads 26 and 27 for the lamp 30. If the lamp 30 were connected on the other side of the thermostat 25 as at 31 in the electrical circuit, the lamp 30 would merely indicate whether or not the input leads 14 were connected to an electrical input source and would not indicate the proper functioning of the thermostat 25. Thus, the lamp 30 may be physically located in other positions, as, for example, in the terminal envelope 24, in the plug 11 or, on the cord 14; but the electrical connection for the lamp 30 is taken on the side of the thermostat 25 near the resistance elements 19 and 20 so as to be operated only when the thermostat 25 is closed.

It is expected that the thermostat 25 will be used in the majority of applications of the present invention, however, the indicator lamp 30 will operate to indicate operation of the resistance elements 19 and 20 whether or not a theromstat is provided.

In the embodiment of the invention shown in FIG. 3, the indicator lamp 30 is shown connected by a third wire or conductor 40 to the terminal connecting lead 23. Thus, lamp 30 is in series with the one heating element 20. The indicator lamp 30 will be operative when two sets of conditions are satisfied, namely, the thermostat 25 is closed to complete an electrical circuit to the lamp 30, and there is no break in circuit within the resistance element 20. Hence, the lamp 30, when connected in this fashion, indicates both that the thermostat 25 is in operation and that there is no break in resistance element 20 or between the heater resistance elements. Such a break could be caused by cutting one or both of the resistance elements 19 or 20. The thermostat 25 is selected from any one of a number of low cost and commercially available thermostats.

As an important feature of the present invention, the indicator lamp 30 is a low cost neon lamp which needs very little power and which is readily enclosed within a plastic envelope 16 so that the lamp is readily visible when lit through the envelope. The envelope 16 is disposed in an opening 32 in the cable body 18 which extends longitudinally sufficiently to just receive the envelope and which extends close to but insulated from the insulated resistance elements 19 and 20. Thus, the envelope 16 affords a relatively flat element adapted to protect the neon lamp 30 and to be disposed with the cable body 18 without affording any additional substantial thickness thereto.

The indicator envelope 16 for the indicator lamp 30 is preferably sealed to insulate the lamp 30 from the heat generated by the lamp, which may adversely affect operation of the thermostat 25, and to seal the lamp 30 from the electrical resistors 19 and 20. In practice, it has been found to be a low cost expedient to have the lamp 30 and thermostat closely positioned to each other, but insulated from each other by separate envelopes 15 and 16. The thermostat envelope 15 is preferably a plastic with electrical properties equal to cable body 18. The envelope 15 is connected by a common heat seal 35 to the indicator lamp envelope 16. Preferably, the envelope 16 is formed from a plastic which is translucent, and even though the plastic may become more opaque after ageing and exposure to the elements, the selected plastic must not prevent the transmission of light therethrough.

Also, to facilitate the low cost construction of the present electrical heating cable, the cable body 18 is manufactured in long, continuous strips, and is severed into appropriate lengths. The terminal envelope 24 is secured to the plastic cable body 18 by a suitable heat seal area 38. As readily apparent from FIGS. 2 and 3, the terminal envelope 24 includes a connector 23 which connects the resistance elements 19 and 20 to complete the electrical circuit. Also, the present electrical heater cable body 18 is preferably of a wider dimension across than the usual cable body and in the preferred form of the invention, the cable body 18 is nominally ¾" to 1" in width. It is preferred practice to use the heater cable 18 at a resistance value of 5 watts per foot in lieu of the conventional heat rate of 6–8 watts per foot.

From the foregoing, it will be seen that the present invention affords a heat cable device with a low cost and effective indicator light readily observable to indicate the operation of the thermostat and/or heater, which was heretofore difficult to ascertain particularly in relative inaccessible locations, or in extremely cold environments. Also, the present invention affords a relatively low cost heating cable device having incorporated therein an indicator light within an envelope disposed in the cable. Finally, it will be seen that the lamp may be connected in series with at least a part of the resistance elements to indicate both operation of the thermostat and also a complete electrical circuit being afforded through the resistance elements. Thus, if one or both of the resistance elements were disabled as by being cut, the lamp 30 would be unlighted.

Hence, while preferred embodiments of the invention have been described and illustrated, it is to be understood that they are capable of variation and modification.

I claim:

1. A heating cable device adapted for use in inaccessible locations in which it is difficult to determine whether the device is operating, said device comprising:
   a relatively thin, flexible heating cable including an electrically conductive resistance heating element embedded in a flexible insulator covering;
   a thermostat, electrically connected and adjacent to said heating element, for controlling energization of said heating element;
   indicator means, comprising an indicator lamp electrically connected to said thermostat and to said heating element and energized only upon closing of said thermostat, for indicating energization of said heating element;
   said indicator means further comprising a substantially translucent insulator envelope encompassing said indicator lamp, said envelope being disposed within an opening in said insulator covering of said heating cable and being of a size precluding a substantial increase in the overall dimensions of said cable.

2. An electrical heating cable device according to claim 1 in which said indicator lamp is located adjacent said thermostat and in which said envelope insulates said indicator lamp from said thermostat and from said heating element.

3. An electrical heating cable device according to claim 1 in which said indicator lamp is connected in series with a part of said resistance heating element to afford a positive indication of energization thereof.

4. A heating cable device adapted for use in inaccessible locations in which it is difficult to determine whether the device is operating, said device comprising:
   a relatively thin, flat, elongated, flexible heating cable including a pair of electrically conductive resistance heating elements embedded in the opposite sides of an elongated web-like flexible insulator covering and electrically connected in series to each other at one end of the cable;
   a thermostat, electrically connected to one of said heating elements at the other end of the cable and adjacent said heating elements, for controlling energization of said heating elements;
   and an indicator lamp electrically connected and adjacent to said thermostat and at least one of said heating elements and energized upon closing of said thermostat to afford a positive indication of energization of said series-connected heating elements,
   said indicator lamp being of a size precluding a substantial increase in the overall dimensions of said cable.

References Cited by the Examiner

UNITED STATES PATENTS

| | | | |
|---|---|---|---|
| 2,728,843 | 12/1955 | Lightfoot | 219—506 X |
| 2,793,280 | 5/1957 | Harvey | 219—549 X |
| 2,824,209 | 2/1958 | Leipold | 219—528 |
| 2,915,615 | 12/1959 | Leipold et al. | 219—549 X |
| 3,004,130 | 10/1961 | Miller | 219—506 X |

FOREIGN PATENTS

| | | |
|---|---|---|
| 742,730 | 1/1956 | Great Britain. |
| 760,126 | 10/1956 | Great Britain. |

ANTHONY BARTIS, *Primary Examiner.*

RICHARD M. WOOD, *Examiner.*

V. Y. MAYEWSKY, *Assistant Examiner.*